US012618975B2

(12) United States Patent
Forsberg

(10) Patent No.: US 12,618,975 B2
(45) Date of Patent: May 5, 2026

(54) TARGETING

(71) Applicant: Teleplan Forsberg Limited, Lancaster (GB)

(72) Inventor: Charles Forsberg, Lancaster (GB)

(73) Assignee: TELEPLAN FORSBERG LIMITED, Lancaster (GB)

( * ) Notice: Subject to any disclaimer, the term of this patent is extended or adjusted under 35 U.S.C. 154(b) by 879 days.

(21) Appl. No.: 17/613,946

(22) PCT Filed: Mar. 23, 2020

(86) PCT No.: PCT/GB2020/050768
§ 371 (c)(1),
(2) Date: Nov. 24, 2021

(87) PCT Pub. No.: WO2020/188304
PCT Pub. Date: Sep. 24, 2020

(65) Prior Publication Data
US 2022/0268932 A1 Aug. 25, 2022

(30) Foreign Application Priority Data
Mar. 21, 2019 (GB) ..................................... 1903926

(51) Int. Cl.
*G01S 17/42* (2006.01)
*F41G 3/02* (2006.01)
(Continued)

(52) U.S. Cl.
CPC ............... *G01S 17/42* (2013.01); *F41G 3/02* (2013.01); *F41G 3/06* (2013.01); *G01S 17/86* (2020.01);
(Continued)

(58) Field of Classification Search
CPC .......... G01S 17/42; G01S 17/86; G01S 19/13; G01S 17/08; G01S 5/00; G06T 7/73;
(Continued)

(56) References Cited

U.S. PATENT DOCUMENTS

| | | | |
|---|---|---|---|
| 10,339,646 B1 * | 7/2019 | Adler | ........................ G06T 7/73 |
| 2008/0001022 A1 | 1/2008 | Sa | |
| 2018/0343401 A1 * | 11/2018 | Campbell | .............. H04N 23/45 |

FOREIGN PATENT DOCUMENTS

EP 3132279 A1 2/2017

OTHER PUBLICATIONS

PCT/GB2020/050758, Forsberg, PCT International Search Report and Written Opinion, International Searching Authority, Aug. 18, 2020.
(Continued)

*Primary Examiner* — Yufeng Zhang
(74) *Attorney, Agent, or Firm* — CASTELLANO PLLC; Richard A. Castellano

(57) ABSTRACT

A targeting method comprising the steps of determining a bearing to a target from an observer using first and second independent techniques; comparing the bearings as determined by the first and second independent techniques and determining whether the bearings are accurate; and if the bearing is deemed to be accurate; measuring a range from the observer to the target; and calculating the position the target based on the verified bearing and range from the observer's position. The bearing can be measured by using a magnetometer, and cross-checked or verified using calculations based on three-dimensional satellite cartography data. The range to the target can be cross-checked, as can the position and viewpoint of the observer.

20 Claims, 6 Drawing Sheets

(51) Int. Cl.

| | |
|---|---|
| F41G 3/06 | (2006.01) |
| G01S 17/86 | (2020.01) |
| G01S 19/13 | (2010.01) |
| G06T 7/73 | (2017.01) |
| G06V 10/80 | (2022.01) |

(52) U.S. Cl.
 CPC ............... *G01S 19/13* (2013.01); *G06T 7/73* (2017.01); *G06V 10/806* (2022.01); *G06T 2207/10028* (2013.01); *G06T 2207/30204* (2013.01); *G06T 2207/30244* (2013.01); *G06V 2201/07* (2022.01)

(58) Field of Classification Search
 CPC . G06T 2207/30204; G06T 2207/30244; G06T 2207/10028; G06V 10/806; G06V 2201/07; F41G 3/02; F41G 3/06; G01C 1/00; G01C 15/002
 See application file for complete search history.

(56) References Cited

OTHER PUBLICATIONS

PCT/GB2020/050758, Forsberg, PCT Written Opinion of the International Preliminary Examining Authority, International Searching Authority, Feb. 25, 2021.
PCT/GB2020/050758, Forsberg, Reply to Written Opinion of the International Preliminary Examining Authority, Jun. 29, 2021.
PCT/GB2020/050758, Forsberg, PCT International Preliminary Report on Patentabitliy, International Searching Authority, Jun. 29, 2021.

\* cited by examiner

TARGETING

This invention relates to targeting, and in particular, but without limitation, to improvements in and relating to targeting systems and methods with improved veracity and cross-checking.

Targeting systems are used in a range of both military and civilian applications for ascertaining the precise position of an object in space. This can be accomplished in a number of ways, such as by using GPS positioning, or by more conventional methods, such as magnetic range and bearing from the observer's instrument (10) to the target (18) or triangulation from the observer's instrument (10) to a known reference point (and therefore reference bearing) and the target (18).

One known problem with GPS positioning is that GPS systems can be "spoofed" relatively easily, and if targeting is based solely on GPS positioning, it is potentially error prone—especially in hostile situations. However, as targeting is used by the military to position ordnance, errors in the coordinates given can lead to misses, an incorrect target being hit, and/or unacceptable collateral damage. When targeting errors occur, there is often a need for a detailed after-the-event investigation, which no existing targeting system can provide with adequate veracity.

Existing targeting systems generally involve the use of a "observer", that is to say, an actual person located somewhere near the intended target, who calculates the position of the target using trigonometry and/or triangulation. The observer is located at a known position, and a rangefinder and compass (which are often both incorporated into a single laser rangefinder/scope type device) are used to measure a bearing and range to the target. Where greater accuracy is needed, the observer can move to other known positions, and take further bearings and range measurements, so as to reduce the size of the "cocked-hat" so produced by the triangulation method. The existing observer system relies on taking line-of-sight measurements to the target being taken.

Clearly, there is potential for error when using the known observer method. First, if the observer's position is inaccurate, or just incorrect, then the bearings and distances measured by the observer will be from an incorrect origin, thereby rendering the entire procedure inaccurate. Second, if the observer measures the bearing incorrectly, even by +/−1 degree, at a range of 2 km, the error in position can be as much as 35 m. Third, if the observer erroneously ranges an object that is located in front of, or behind the intended target, then large range errors can occur.

The situation is illustrated, schematically, in FIGS. 1 and 2 of the drawings, which are schematic oblique and plan views, respectively, of a hypothetical terrain. An observer is located at point 10 and is observing a view down a valley (as indicated by the contour lines in FIG. 2) towards a building 12, which is the intended target. Between the observer 10 and the target 12 there is a bridge 14. A chimney 16 is located behind the target 12.

Using a laser rangefinder, the observer 10 sights 18 the centre of the target building 12 and records the bearing 20 and distance 22. From the origin of the measurement, namely the observer's position 10, the location of the target 12 on the map (FIG. 2) can be plotted.

However, if the observer is in a different location 100 to where s/he thinks s/he is, then the bearing 120 and/or distance 122 measurements will be incorrect. Further, if when sighting the target building 12, the observer accidentally ranges the bridge pier 24 by mistake, then the range to target will be completely wrong. Likewise, if the observer intends to target the chimney 16, but accidentally ranges the building 12 in front of it, even though the bearing measurement may be within acceptable limits, the range measurement will be too short.

The problem is not restricted to errors in the plane of the map (e.g. in FIG. 2) because if the observer intends to target, for example, a vehicle 30 crossing the bridge 14, then the elevation of the target 30 also needs to be considered. Any error in the range measurement could result in missing the target completely—with ordnance landing in the valley below the vehicle 30, rather than striking the bridge 14 or vehicle 30 itself.

The foregoing hypothetical example illustrates the problem, and to confound matters further, due to the potential for errors at each stage of the targeting procedure, there is no way to know which measurements were incorrect, or indeed if the correct target was actually spotted.

A need exists for a solution to one or more of the above problems, which aspects of this invention aim to provide.

According to a first aspect of the invention, there is provided a targeting method comprising the steps of: determining the bearing to a target from an observer using first and second (or more) independent techniques; and comparing the bearings as determined by the first and second independent techniques and determining whether the bearings are accurate; and if the bearing is deemed to be accurate; measuring a range from the observer to the target; and calculating the position of the target based on the verified bearing and range from the observer's position. The over-riding principle is to compute the target coordinates from two or more independent measurement methods while establishing a satisfactory correlation of the target's (or targets') location from all the methods. By a mathematical and logical process all part or wholly computed positions will be compared with anomalous measurements being correctly identified and brought to the observer's (or observers') attention.

The invention provides a method of cross-checking and verifying the target coordinates from an observer's position using two independent, and preferably different, techniques.

The invention involves determining the bearing to a target from an observer using first and second independent techniques, which are preferably different techniques.

Conventionally, an observer would use a laser rangefinder/scope-type device to take bearings and obtain ranges to targets within his/her field of view. The observer looks through the viewfinder and captures an image of a scene placing the "cross-hair" upon the target within the viewfinder. By pressing a button, the image is captured and the distance to the cross-hair is measured using a laser rangefinder, which is coaxial with, or parallel to, the optical axis of the laser rangefinder.

Meanwhile, the laser rangefinder comprises a compass/magnetometer, which measures the bearing (and optionally the elevation) of the laser rangefinder at the time that the measurement was taken (i.e. when the button is depressed). All of the data is suitably recorded, preferably in an external source, for later verification purposes.

However, compasses and magnetometers are subject to errors such as magnetic variation and magnetic deviation both of which are variable commodities. The value of the magnetic variation changes depending on the observer's position on the earth's surface and metal/ferrous objects around him, and although variation data are provided in almanacs and the like, geology could give rise to the local variations, resulting in inaccuracy. More importantly, however, is deviation, which arises due to the integration of the compass/magnetometer with ferromagnetic objects in the vicinity of the observer at the time the bearing is taken. Because many steel/ferrous objects may be around at the time the measurement is taken, the deviation error is not something that can be easily accounted for. In fact, it is possible to have +/−5 degrees or so that could be unaccounted for due to metal/magnetic objects nearby. This means that the bearing and/or elevation measurements obtained using the laser rangefinder could be inaccurate, but the observer would have no way to know this at the time the measurements were taken.

The invention therefore proposes to prove two or more independent location measurement techniques for verification purposes. One such technique could be bearing verification which largely follows the method outlined above in relation to determining the position of the observer using three-dimensional satellite cartography data—including elevation data.

In short, the observer would observe range and bearing measurements for three, but preferably four or more, points within his/her field of view, which correspond to features in the three-dimensional satellite cartography data set. By triangulation, it is possible to work out the position, pan/tilt and roll angles of the laser rangefinder at the point the measurements were taken.

In this case, however, the laser rangefinder can be stabilised in some way, for example, by mounting it on a stable tripod and so that a fixed "field of view" image is captured with several identifiable features within a single image. Now, rather than aiming the laser rangefinder at each target individually, the technique is modified slightly by picking-out features within the image, which have x and y pixel displacements relative to the centre pixel (i.e. the optical axis) of the laser rangefinder. Based on the relative pixel positions within the image and a calibration for aberrations in the lens, it is possible to work out the subtended angles both in azimuth and elevation, and thereby triangulate the positions of other objects within the field of view.

In practice, the observation process would pick four or more random, but identifiable features within the field of view; measure the subtended angles (azimuth and elevation) between them; and transpose those points of interest in the three-dimensional satellite cartography data. A triangulation can then be carried out within the three-dimensional satellite cartography data to identify the position of the observer and to scale the angles within the field of view to actual, true bearings. Once this procedure has been completed, it is possible then for the observer to identify the target within the image by placing a cursor upon it, and to interpolate between the previously-determined bearings to obtain a true bearing from the observation point to the target.

That done the observer, as a minimum implementation of this method can compare the directly-measured bearing with the bearing calculated from the three-dimensional satellite cartography data, to check that they are close enough to one another to be deemed accurate. If the difference between the two sets of data is sufficiently small, then the bearing measurement can be deemed "accurate" and the procedure can continue. If, however, an unacceptable error is identified, then the procedure can be repeated until the error has been removed.

Regardless, all of the data is captured and recorded, preferably in a remote storage device, so that the targeting/verification procedure can be run through again after the event, should the need arise.

According to a second aspect of the invention, there is provided a targeting method comprising the steps of: determining the position of an observer using first and second independent techniques; and comparing the observer's positions as determined by the first and second independent techniques and based on the comparison, determining whether the observer's position is accurate; and if the observer's position is deemed to be accurate; measuring a bearing to a target from the observer; measuring a range to the target from the observer; and calculating the position the target using the verified position of the observer, the bearing and the range measurement.

The position of the observer is determined using first and second independent techniques, which are preferably different techniques. Suitably, a first technique for determining the position of the observer could be by using a GPS receiver on the observer's person or nearby. The GPS receiver can be configured to receive latitude, longitude and elevation coordinates, which can be taken to be the first means of determining an observer's position. Alternatively, the first (or second) independent technique could involve the observer standing at a fixed position relative to a known landmark, which is shown on a map. This could be, for example, a road intersection, a building or other feature clearly marked on the map. The GPS or map reading could be the primary positioning techniques used by an observer. However, for the reasons previously mentioned, GPS signals can be relatively easily spoofed or blocked, which could give rise to no GPS data being available, or the GPS data being inaccurate. Likewise, if the cartography data is out of date or inaccurate, then the second conventional way of the observer determining his/her position could be inaccurate. However, in the field, the observer would not know whether his/her position was indeed accurate, or erroneous.

The invention therefore proposes to use a second technique, which is independent of the first technique, to cross-check and/or verify the accuracy of the observer's position determination. The second independent technique for determining the position of the observer is suitably based on three-dimensional data, which contains a plan view of the terrain in addition to an elevation map, which shows the elevation of objects/features on the map. The three-dimensional satellite cartography data basically takes the form of a highly-detailed contour map showing not only the contours of the terrain but also the "contours" of any objects on the map, such as trees, walls, buildings, road surfaces, fences etc. The accuracy of three-dimensional satellite cartography is nowadays extremely high and due to the continuous nature of the satellite data collection and mapping process, is updated very regularly. However the map and imagery data can be checked for veracity by overlaying field-collected imagery which should fit perfectly to that map and imagery data. By example, internal angles measured within the observer's (observers') imagery collected at 10 in FIG. 2 will fit perfectly to the map/satellite imagery in 3D if suitable elevation data is available and all are correct and not distorted. The method used correctly will only allow one unique orientation of the observer's (observers') image taken at 10 to fit with the map and satellite imagery. The observer's computed location by this method can be compared to observer generated position from GNSS (in this example) mentioned earlier.

To verify the position of the observer, the observer can take bearings and ranges to a number of features within view, which correspond to identifiable features in the three-dimensional satellite cartography data. The observer would measure the range and bearing to an object within his/her field of view by taking a photograph through a laser rangefinder type device. Preferably, the captured photography data is recorded for future reference/cross-checking purposes for reasons that shall become apparent later.

The observer measures the azimuth and elevation angle from his/her position to the object within his/her field of view and records the range to the "laser spot" in the image. The observer then repeats the procedure for a number of different objects within his/her field of view, which also correspond to features appearing in the three-dimensional satellite cartography data map.

Provided the angles subtended between the different objects which have been spotted are great enough, it should be possible to triangulate or otherwise calculate the position of the observer using software associated with the three-dimensional satellite cartography data.

Because the observer records both azimuth and elevation angle, and because the three-dimensional satellite cartography data also contains elevation information, it may be possible to accurately triangulate not only the position of the observer but also the pan, tilt and roll angles of the observation camera at the time the measurement/photograph taken.

Preferably, the observer will take measurements to three different points of interest, but most preferably to four or more different points. The reason for this is to avoid an "inversion" in the trigonometric calculations, which could result in more than one solution to the trigonometric problem. If the observer takes measurements from at least four objects, provided those objects are non-co-planar, then there will be only a single solution to the trigonometric problem, which results in a single position, roll, tilt and pan angle for the observer.

The observer can then transpose the calculated the position onto the conventional map, or plot the map position in the three-dimensional satellite cartography data map.

If the two positions (determined by different, independent techniques) coincide, then the observer can be confident that the position is accurately known because the two positions have been obtained independently. However, if there is a noticeable difference between the respective positions, then the observer is immediately alerted to the fact that something is amiss, and the position determination can be repeated until an accurate position has been obtained.

Once the observer knows that his/her position is accurate and has been verified, he/she can then take a range and bearing to the target and, by trigonometry, or other calculation, calculate the position of the target for targeting purposes.

At each stage of the procedure, the bearings, distances and positions are recorded and stored, preferably in an external storage device. This means that if there are found to be any errors in the targeting, then the targeting procedure can be interrogated after the event to identify where the error may have arisen.

According to a third aspect of the invention, there is provided a targeting method comprising the steps of: determining the range from an observer to a target using first and second independent techniques; and comparing the ranges as determined by the first and second independent techniques and determining whether the ranges are accurate; and if the range is deemed to be accurate; measuring a bearing to the target from the observer; and calculating the position the target based on the verified range and bearing from the observer's position.

Conventionally, the range to a target is measured using a laser rangefinder type device, which emits a laser beam, which is reflected back off the target to a detector within the device. The distance to the target is calculated using interferometry and can be mm or cm accurate in many cases, under ideal conditions. However, laser range-finding can also be susceptible to inaccuracies caused by, for example, specular reflection and/or transient weather conditions (such as rain/fog) which can give rise to inaccurate measurements.

Nevertheless, by far and away the most important "error" with laser range-finding subsists in the observer's ability to centre the laser spot on the actual target. In an "open field" situation, identifying a specific target can be relatively easy. However, when targeting a specific building in a built-up area, or specifying a particular object which is located in front of/behind another object, if the elevation of the laser beam is inaccurate, then it is possible for the laser beam to be reflected off the building in front of or behind the intended target, giving rise to inaccuracy.

Laser range-finding is a "line of sight" measurement technique and it is not always readily apparent than an error has, in fact, occurred until after the event. The invention aims to provide a solution to this problem by providing a cross-checking/verification technique, which is independent of the original range-finding measurement.

The invention suitably relies on the use of three-dimensional satellite cartography data, which contains elevation information. The elevation information can be highly detailed and usually includes not only terrain contours, but also "contours" corresponding to building heights, tree heights, wall heights etc.

A laser rangefinder used to capture an image of a scene containing the target from the position of the observer, which position can be verified using the technique previously described. In addition, the bearings and elevation angles within the field of view can also be verified/cross-checked using the techniques previously described.

That being said, an observer can place a cursor within the captured image on the intended target and once the captured image has been calibrated/snapped onto the three-dimensional satellite cartography data, it is possible to place a straight line in the satellite cartography data, which corresponds to the line of sight of the observer to the target.

The secondary range verification technique involves tracing a ray from the observation point within the three-dimensional cartography model to the target along a perfectly straight line and extending that line through the three-dimensional satellite cartography image infinitely. The crucial point here is that the first point from the observation point that the superimposed line impinges on the three-dimensional "surface" within the three-dimensional satellite cartography map will be the "range" that should have been measured by the observer. This is due to the "line or sight" nature of range finding. The range to the target can therefore be calculated from the three-dimensional satellite cartography data as being the straight-line distance between the observation point and the first point along that line which intersects the three-dimensional surface within the three-dimensional satellite cartography data.

If the calculated range corresponds to the measured range, then the observer can be confident that the range measurement is accurate. However, if there was any significant difference between the two, then the observer knows that something is amiss, and the procedure can be repeated.

Crucially, all of the data is preferably recorded, ideally in a remote data device, so that the measurement and verification procedures can be re-run offline later on, if necessary.

A fourth aspect of the invention provides a targeting method comprising the steps of: determining the position of an observer using first and second independent techniques; and comparing the observer's positions as determined by the first and second independent techniques and determining whether the position of the observer is accurate; and if the observer's position is deemed to be accurate; determining the range from an observer to a target using first and second independent techniques; and comparing the ranges as determined by the first and second independent techniques and determining whether the ranges are accurate; and if the range is deemed to be accurate; determining the bearing to a target from an observer using first and second independent techniques; and comparing the bearings as determined by the first and second independent techniques and determining whether the bearings are accurate; and if the bearing is deemed to be accurate; calculating the position the target based on the verified range, verified bearing from the observer's verified position.

It will be appreciated from the foregoing that the accuracy and/or veracity of a targeting system can be improved if two or more cross-checking/verification steps are performed. In particular, the position of the observer and the bearing to the target can be cross-checked. The position of the observer and the range to the target can be cross-checked. The bearing to the target and the range to the target can be cross-checked. Most preferably, all three of the position of the observer, the bearing to the target and the range to the target are cross-checked and/or verified.

The invention shall now be described, by way of example only, with reference to the accompanying drawings in which:

FIG. 6 is a view through the binocular of FIG. 5 with an information overlay switched on;

Figures 1, 2:
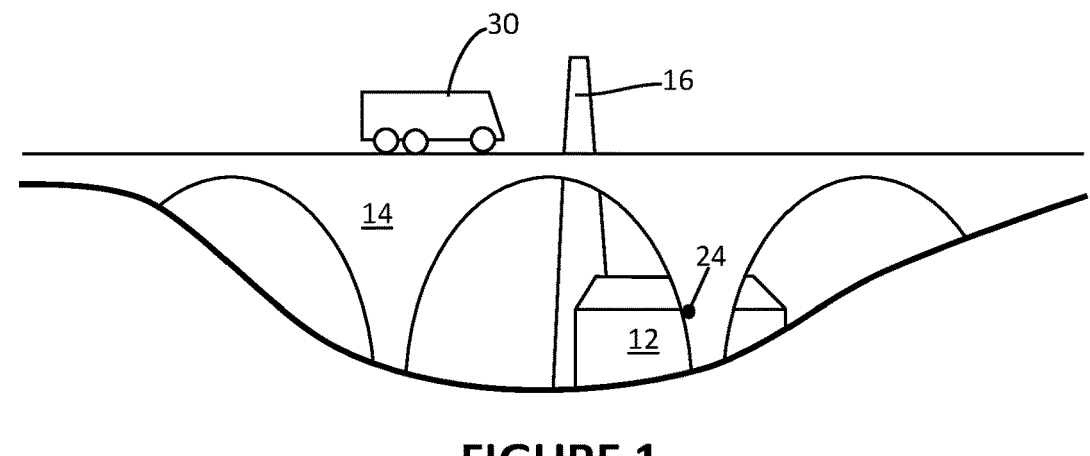
FIG. 1 is a schematic oblique view of a scene, as observed by an observer.
FIG. 2 is a topographic/cartographic view of the scene shown in FIG. 1.
Figure 3:
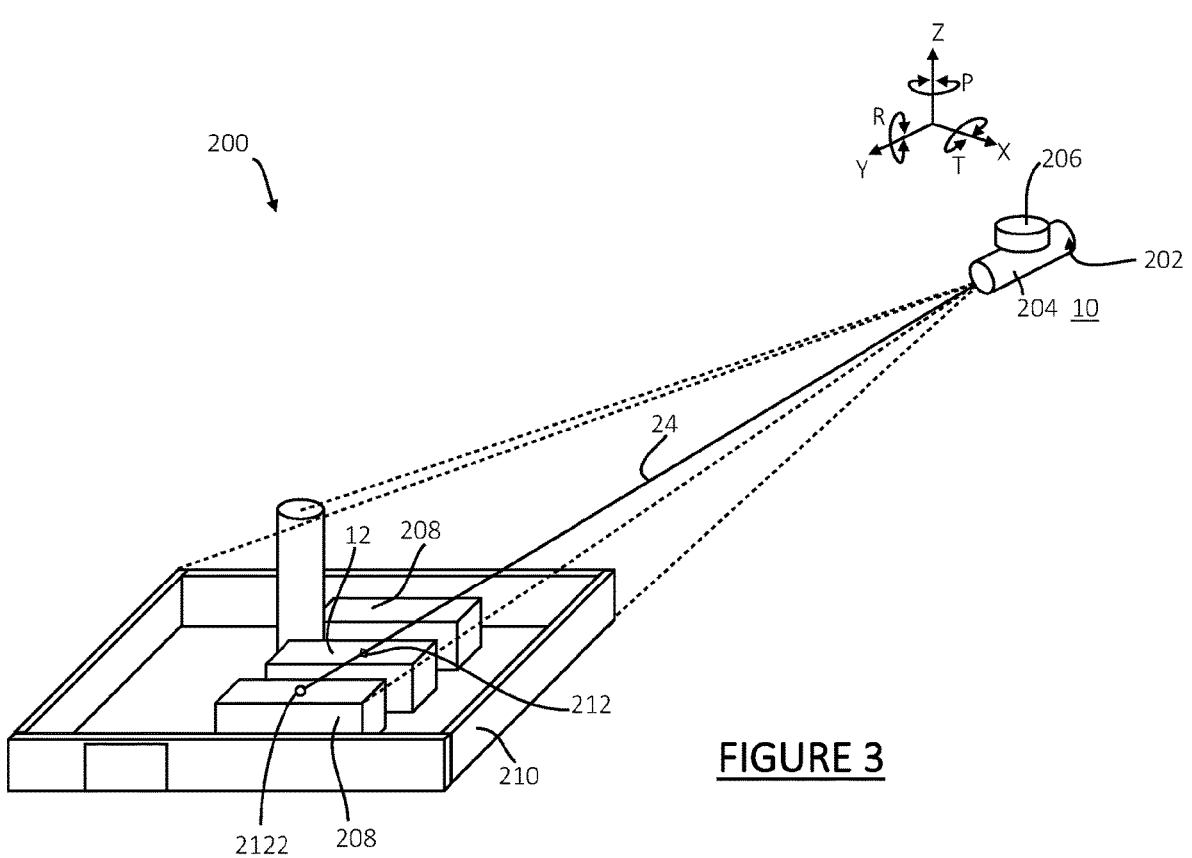
FIG. 3 is a schematic, oblique view of an observation made in accordance with the invention.

Referring to FIG. 3 of the drawings, an area 200 is observed by an observer using a laser rangefinder 202, who is located at a fixed point 10. The laser range finder 202 comprises a camera 204 and a positioning system 206. The laser range finder 202 is pointed towards an area 200 by the observer, in which it is intended to target a particular building 12. It will be noted that the intended target 12 is surrounded by other buildings 208 and other features, such as a perimeter wall 210.

The observer fixes the laser rangefinder 202 from a fixed point in space 10, for example by mounting it upon a stable tripod, and he/she observes the scene 200 through the camera 204. The observer points the camera 204 so that the crosshair falls onto a target spot 212 on the target building 12. The laser rangefinder 202 has a positioning system 206, which is a GPS receiver, which records the latitude, longitude and elevation of the rangefinder 202 at the time that the target is observed. The observer can press a button (not shown) on the laser rangefinder to initiate a (laser) range-finding procedure, which measures the distance 224 between the laser rangefinder 202 and the target spot 212. The bearing, inclination and range are recorded as well, so that the observer can calculate the position of the target spot 212 using trigonometry.

However, for the reasons previously stated, using the aforesaid method, there is no way to check the accuracy of any of the measurements, namely the actual position of the rangefinder 202 nor the transposition of the target spot 212 onto the map. The invention therefore proposes to cross-check the measurement procedure using the same equipment, albeit via a different method.

Figure 4:
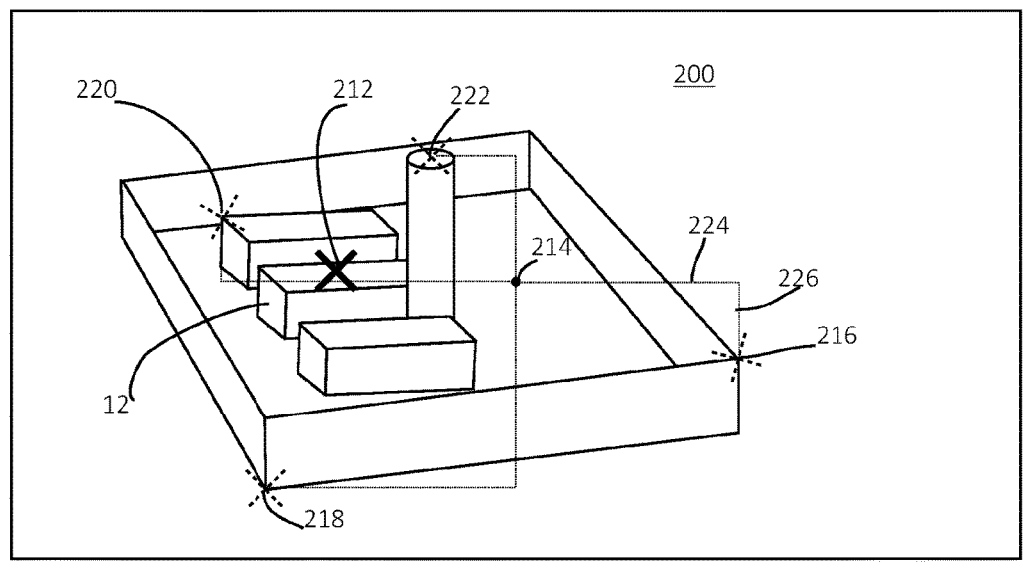
FIG. 4 is a view, as seen by the observer, of the scene illustrated in FIG. 3.

FIG. 4 is a schematic image of what the observer observes through the rangefinder 202. The observer fixes the rangefinder 202 at a fixed position and orientation then aims it towards the scene 200. An image is then captured by a camera in the rangefinder 202 and the image is exported into a software system, which enables the cross-checking/verification to take place.

It will be noted that the image shown in FIG. 4 does not correspond precisely to the scene in FIG. 3 because the rangefinder 202 is not centred on the target spot 212. However, this does not matter and indeed, it may be beneficial in certain circumstances, for there to be an offset between the target spot 212 and the optical axis 214 of the camera.

Using the image, the observer places cursors 216, 218, 220, 222 on readily identifiable features in the image. The X/Y offset—224/226 for each crosshair position 216, 218, 220, 222 is calculated in the software and using a lens aberration calibration, the angles subtended between the cross-hairs both in azimuth and elevation can be calculated. Also, once the system has been calibrated, it is possible to simply place a cursor/crosshair in the image on an object or target, and to calculate the range and/or bearing to that object or target. This reduces or removes the need to sight each object or target individually.

The observer can then transpose which he believes to be the four cross-hair positions into a corresponding three-dimensional cartography model that includes the same features which have been identified in FIG. 4. Provided the locations of the cross-hairs in real space are not co-planar, and provided four or more cross-hairs have been placed, there should only be one mathematical solution to the trigonometric problem, which precisely determines the XYZ position of the rangefinder 202, as well as its pan, tilt and roll angles (P, T, R) at the time the image was taken.

The observation point 10 can then be transposed into the three-dimensional cartography model and its position should now correspond to the relative position of the observer to the object in the scene 200. That done, the observer can place a targeting cross-hair 212 on the spot on the target building 12, which he/she thought they had spotted in the first procedure and the horizontal 224 and vertical 226 offset of the target cross-hair 212 relative to the optical axis 214 can be measured. The offset 224, 226 can be converted, by interpolation between the previously-calibrated cross-hairs 216, 218, 220, 222 into an azimuth and elevation direction from the observation point 10 which has previously been determined.

The observer can then compare the manual measurement result to that obtained using the three-dimensional cartography model and determine whether or not his/her position is accurate. The user can also manually identify whether the target 212 is relatively correct to the other features in the image and 3D map/cartography. This type of check is currently good practice but sometimes the wrong building can be identified especially if there is a large number of similar buildings. They can also compare the bearing and inclination angle measured using the laser rangefinder 202 with the azimuth and elevation angles calculated using the three-dimensional cartography software method. If these two correspond to an acceptable level, then the observer can be confident that the target has been correctly pinpointed and transposed onto the map. If, however, there are any significant errors, then the procedure can be repeated until the observer is satisfied with the accuracy and veracity of the results/measurements obtained. The range to the target 24 can also be cross-checked using the three-dimensional cartography model.

Referring back to FIG. 3 of the drawings, it can be seen that the target spot 212 could easily be misplaced 2122 onto a building in front of, or behind (in the present example) the intended target building 12. This is particularly the case where the measurement is being taken from a "grazing angle" in which case, the range measurement may be many meters out and the incorrect coordinates will have been provided. Specifically, referring to the example in FIG. 3, the range measurement would target the building behind the intended target 12, which would be unacceptable.

However, using the three-dimensional cartography model, it is possible to trace a straight line from the calculated observation point 10, along the calculated azimuth and elevation direction to a point where it intersects a surface on the three-dimensional cartography model. This would be the calculated range to target from the calculated observation point. Therefore, if the calculated range to target corresponds to the measured range to target 24, then the observer can be confident that they have placed the laser spot on the correct building 12. If, however, there is a significant difference between the measured distance to target 24 and that calculated using the three-dimensional cartography data method, then the observer can readily ascertain that something is amiss, and the calculation/measurement can be repeated.

Figure 5:
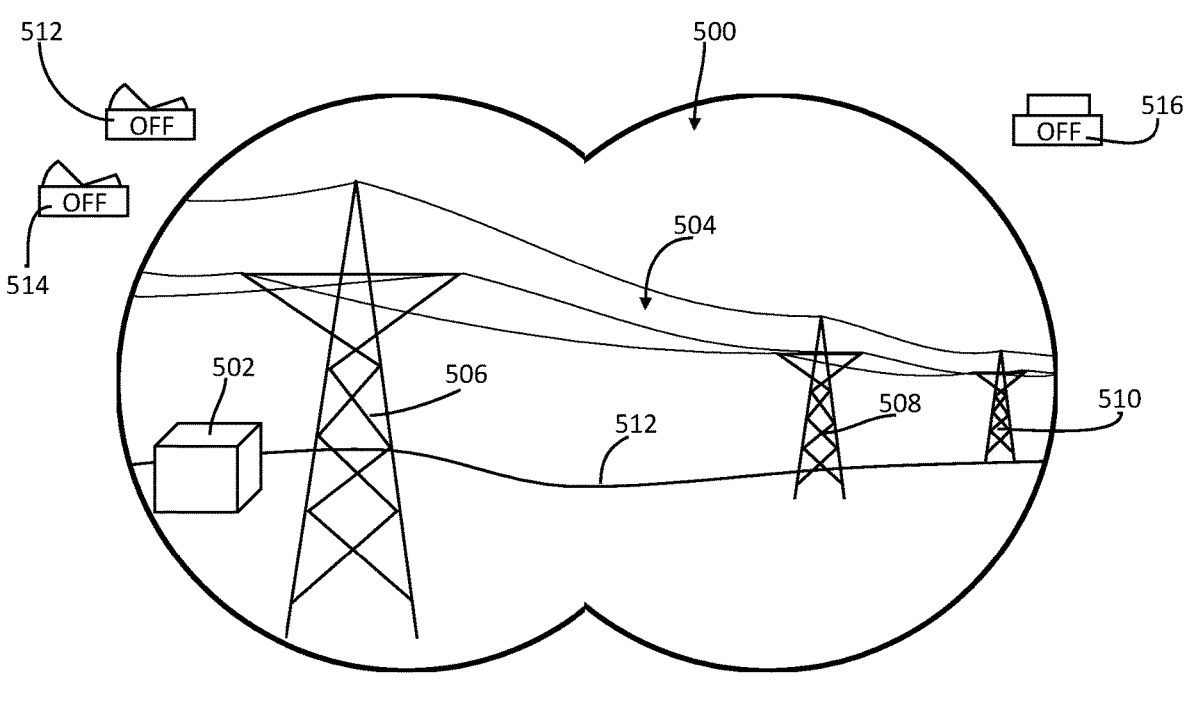
FIG. 5 is a schematic view through a range-finding binocular in accordance with the invention in a passive mode of operation.
Figure 6:
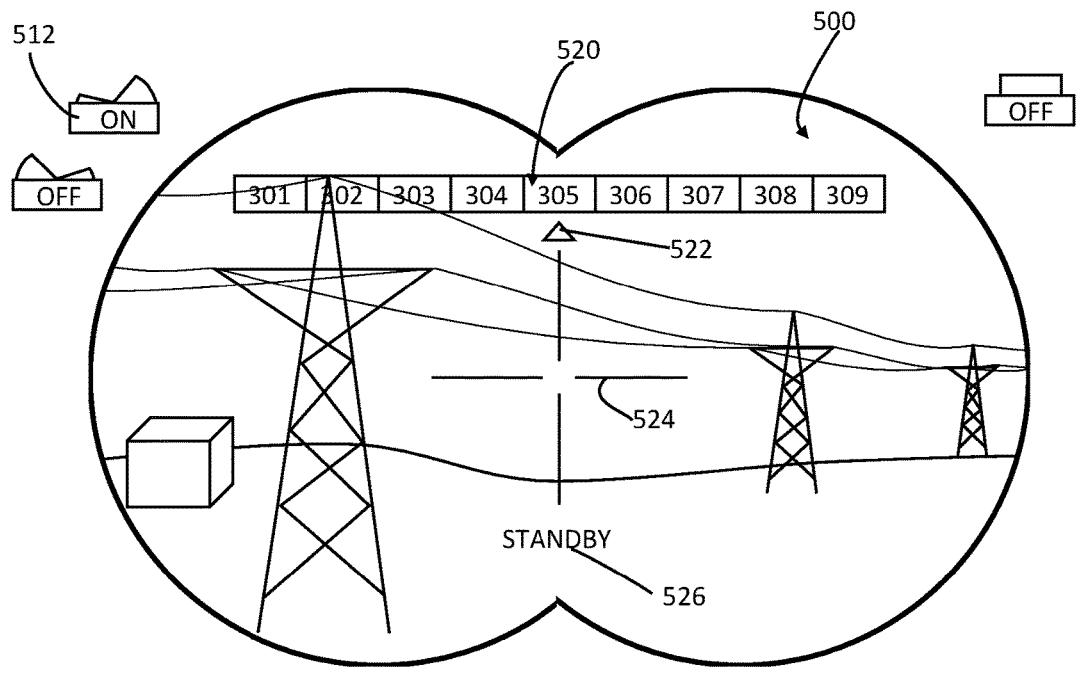
Figure 7:
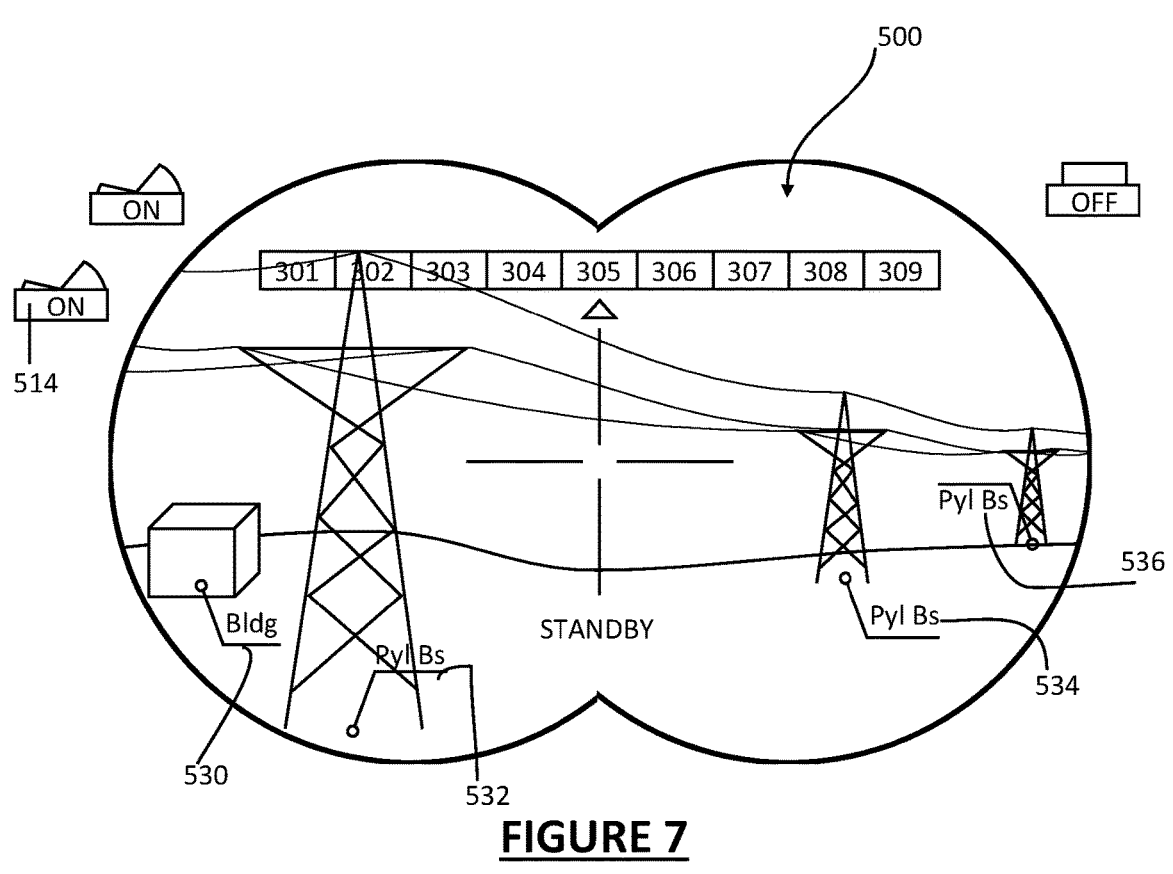
FIG. 7 is a schematic view the binocular of FIG. 5 with the information overlay switched on and including a 2-dimensional augmented reality overlay.
Figure 8:
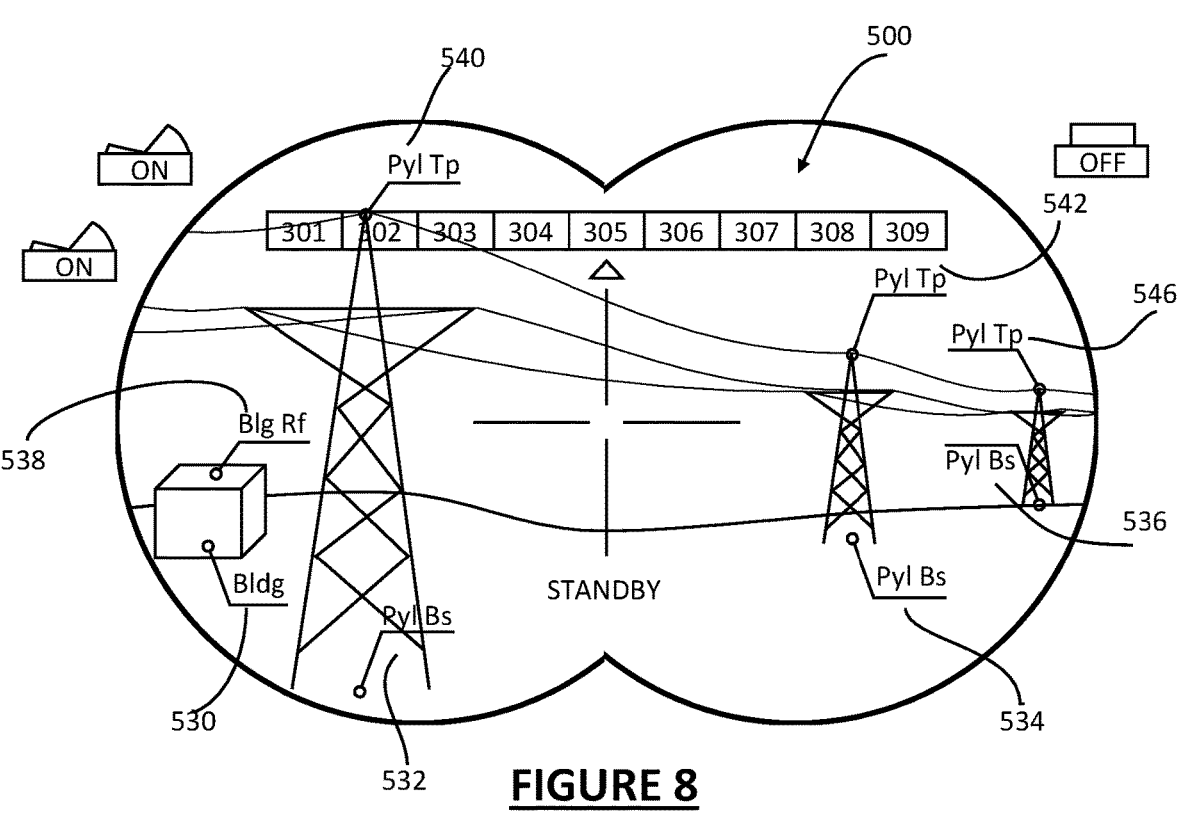
FIG. 8 is a schematic view through the binocular of FIG. 7, with 3-dimensional augmented reality information overlaid.

Referring to FIGS. 5-12 of the drawings now, a range finding binocular in accordance with the invention comprises a set of conventional optics and a projection system built into it, which enables a computer-generated image to be composited with the optical image. The binocular has three modes of operation, namely a "passive" optical binocular mode, as shown in FIG. 5 of the drawings; an "informational" mode, as shown in FIG. 6 of the drawings, and an "augmented reality" mode, as shown in FIGS. 7 and 8 of the drawings.

As can be seen from FIGS. 5-12 of the drawings, a view 500 through the binoculars is shown. Within the field of view, several objects can be seen, namely a building 502, and a power line 504 supported on pylons 506, 508, 510. The horizon 512 is also visible.

The binocular has three control switches/buttons, namely a main overlay switch 512, an augmented reality overlay switch 514, and an activation momentary push switch 516, whose functions shall be explained in greater detail below. However, it can be seen, in FIG. 5, that all three switches 512, 514, 516 are in the "off" position, and so the binoculars simply function as an ordinary set of optical binoculars providing a (typically) magnified image of the scene in front of the observer.

When the overlay switch 512 is moved to the "on" position, the internal projection system within the binoculars activates and projects, within the field of view 500, an informational display. The informational display comprises a bearing component 520, which has a strip of numbers corresponding to bearings that moves relative to an indicator arrow 522 such that the direction of observation can be determined. A cross-hair 524 is also overlaid with the image, and this indicates the optical axis, or some other reference point, within the field of view 500. A further information display 526 is located below the cross-hairs 524, and indicates that the range finding function is in standby mode. As the range finder is typically a laser rangefinder, and because laser beams can be observed using certain types of camera, it is preferable that the laser beam is switched off by default and only switched on as and when required, to avoid/reduce the likelihood of revealing the location of the observer. As the operator moves the binoculars and thus changes the field of view 500, the indicated bearing will change as the angle of the binoculars is moved in real time.

Referring now to FIG. 7 of the drawings, the same view through the binoculars 500 is shown, but in this case, the augmented reality switch 514 has been moved to the "on" position. The binoculars comprise a GPS/GNSS unit and an orientation sensor, which enables them to interface with an augmented reality application, which accesses position data for known objects in the vicinity. The projected overlay therefore now includes markers 530, 532, 534, 536 within it, which call-out, in real time, identifiable objects within the field of view 500. In this case, a building 530 is called-out, as well as the base positions of the three pylons 532, 534, 536, visible within the field of view 500. The augmented reality data, and hence the informational overlays 530, 532, 534, 536 are based on 2-dimensional cartography data and the position and orientation of the observer in real-time. Thus, as the observer moves the position and/or orientation of the binoculars, thus changing his/her position and the field of view, the locations of the markers 530, 532, 534, 536 within the field of view 500 updating real time. If the sighting device is accurately located within the augmented reality space, then the locations of the markers will correspond exactly with the locations of the objects as seen through the optics—as they are in FIG. 7.

A further modification to this is shown in FIG. 8 of the drawings, where 3-dimensional cartography data is used. Now, not only are the 2-dimensional positions of objects within the field of view shown 530, 532, 534, 536; but so too are vertically offset points of reference, such as the building roof, 538, and the tops of the pylons 540, 542, 546, respectively. Again, if the sighting device is accurately located within the augmented reality space, then the locations of the markers will correspond exactly with the locations of the objects as seen through the optics—as they are in FIG. 8.

It will be appreciated that by using 3-dimensional cartography data, as described previously, it is possible not only to determine the bearing/angles between objects within the field of view in a horizontal plane but also the elevation angles as well between those points of interest.

Figures 9, 10:
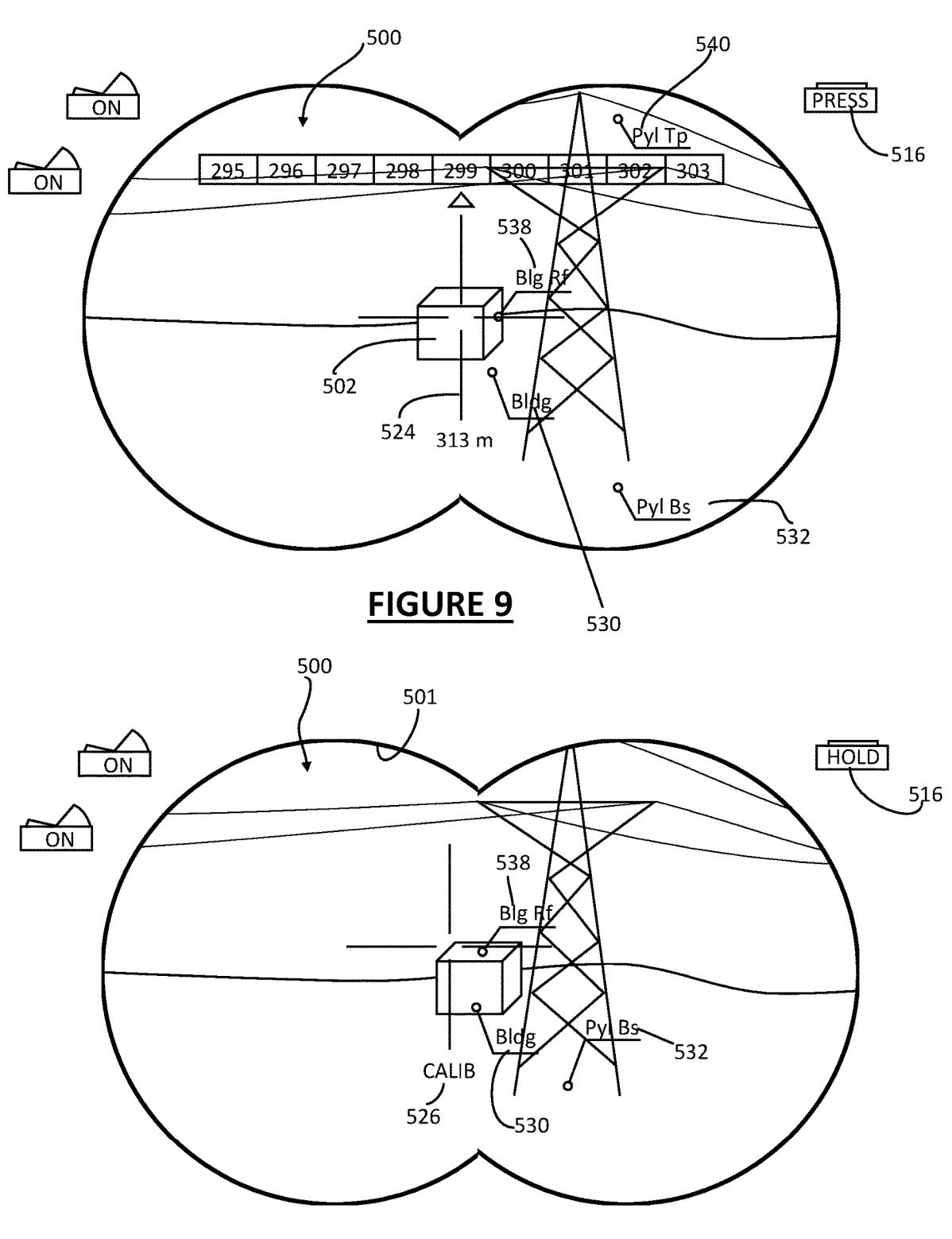
FIGS. 9-12 are a sequence showing how the binocular in accordance with the invention can be calibrated.

Notably, the binoculars as shown in FIGS. 7 and 8 are correctly calibrated with the augmented reality imaging model correctly mapped onto the field of view 500 of the observer. However, the observer may be wearing a metal wrist watch, or may be carrying metallic objects which can adversely affect the magnetometer, and/or the GPS/GNSS and/or orientation sensor may be inaccurate. Thus, when the cross-hairs 524 are trained on a target 502, such as the building previously described, the positioning of the augmented reality markers 530, 532, 538, 540 may not accurately correspond with what is seen through the optical element of the viewfinder, and this indicates an error somewhere—be that in the positioning (GPS) of the range finding device, its orientation (pan, tilt, roll) or the magnetic information. Either way, it is readily apparent to the user that something is amiss, and that recalibration is required. As can be seen in FIG. 9, when the user depresses the activation button 516, the augmented reality information is not as it should be, and this therefore prompts the user to carry out a calibration procedure.

As shown in FIG. 10 of the drawings, the activation button 516 can be held down thereby "freezing" all of the information overlay relative to the perimeter 501 of the field or view 500. Whilst holding-down the activation button 516, the user can move the binoculars until the now-frozen augmented reality information 530, 532, 538 aligns correctly with what is seen through the optical element of the view-finder. A calibration message is shown in the supplementary information area to indicate that calibration is underway, and the magnetic heading area 520 is suppressed temporarily during the calibration procedure. The purpose of supressing the extraneous information within the display is to make it easier to identify and overlay the AI information onto the real-world information during the calibration procedure. It may be that several attempts at recalibration are required, for example, a first pass to correct for azimuth errors, and a second pass to correct for elevation errors. The process can simply be repeated, iteratively if required, so as to "drag and drop" as many markers onto actual objects as possible.

Figures 11, 12:
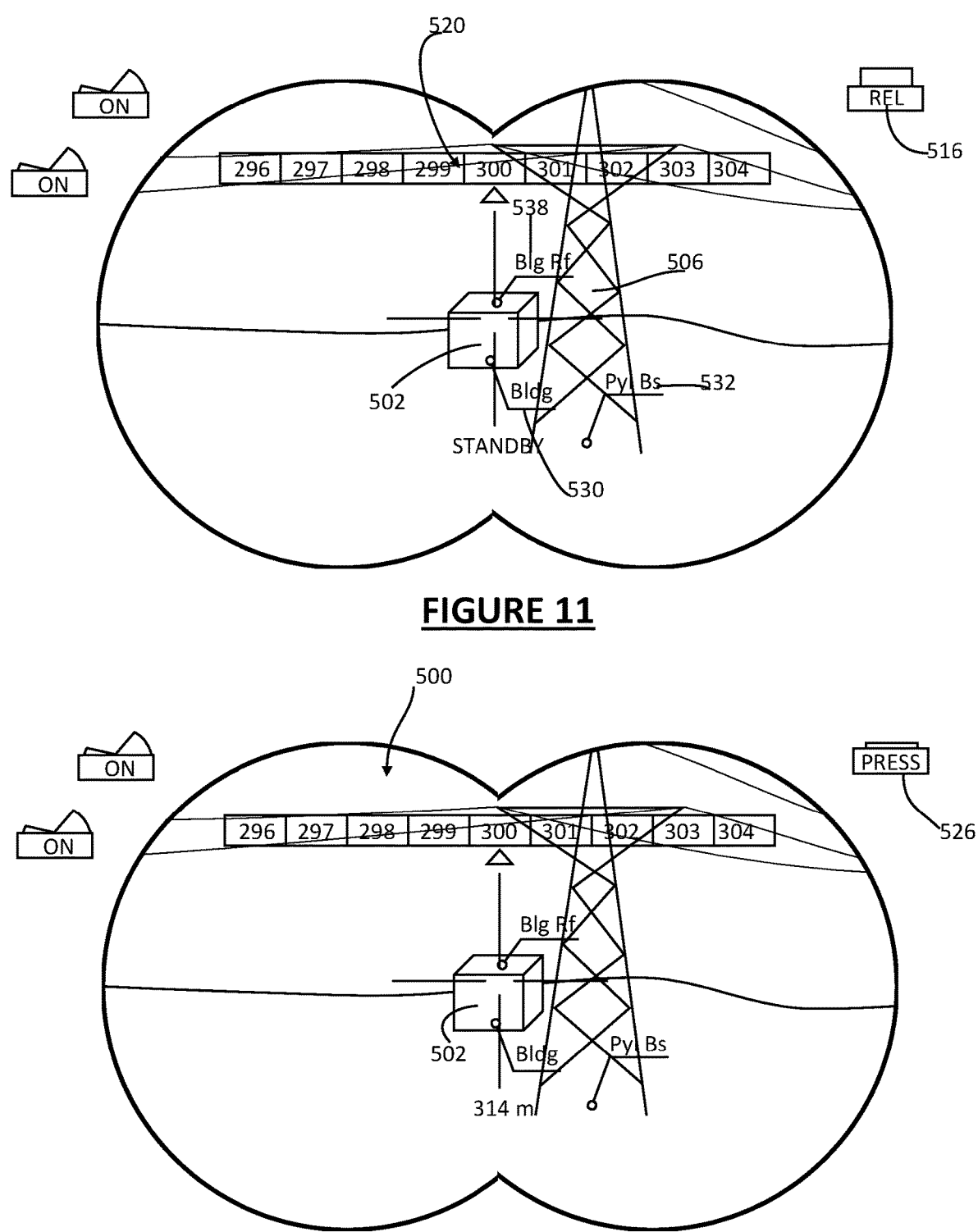

Once the operator is satisfied that the augmented reality markers 530, 532, 538 correctly map onto real objects in the field of view, the activation button 516 can be released, as shown in FIG. 11 of the drawings and the device is now calibrated. In this case, it can be seen that the magnetic bearing information panel 520 is displayed once again and it can be seen that the augmented reality makers 530, 532, 538 now map onto the objects within the field of view 502, 506 correctly. Specifically, the indicated bearing is now 300 degrees to the building, whereas previously it was 299 degrees.

When the activation button 526 is depressed again, because all of the augmented reality imaging data and optical, real-time image match, the user can have greater certainty that his/her position and the bearing is accurate. In this case, the measured range to target is now 314 meters, and the bearing, which has been calibrated, is 300 degrees.

If the calibration procedure has not been carried out, then the bearing to the target would have been 299 degrees and a distance of 313 meters, as opposed to the correct bearing and distance, namely 300 degrees and 314 meters, respectively.

Each time the activation button 526 is depressed or held-down, an image of what is actually seen through the viewfinder is captured and stored, preferably on a remote server. Therefore, it can be verified which target/building 502 was targeted, and that the imagery as seen through the range finding device 500 has been calibrated and/or verified against cartography data.

Although not shown in the illustrated embodiments, a remote data server is suitably provided to which all of the measurements are either uploaded in real-time or near-time. The data includes the GPS positioning data from the laser rangefinder, any images captured thereby, the locations of any crosshairs placed in the image by the observer, and any other measurements taken at the time. The advantage of storing this data remotely is that if the laser rangefinder were to be destroyed, then it would nevertheless be possible to view the data at a later date, should the need arise. In addition, it is also possible to recreate/simulate the observation using the data, which may be necessary if, for example, an investigation is subsequently required.

The invention is not restricted to the details of the foregoing embodiments, which are merely exemplary of the invention.

The invention claimed is:

1. A targeting method, comprising:
determining a verified bearing to a target from an observer using first and second independent techniques to obtain a first bearing measurement and a second bearing measurement, respectively;
comparing the first bearing measurement and the second bearing measurement as determined by the first and the second independent techniques to determine whether the verified bearing is accurate; and
if the verified bearing is deemed to be accurate,
measuring a range from the observer to the target; and
calculating the position of the target based on the verified bearing and range from the observer's position characterised by:
obtaining the first bearing measurement by using a laser range finder comprising an image capture device and a compass or
magnetometer to measure a bearing to three or more features within an image captured by the image capture device;
obtaining the second bearing measurement by using three-dimensional satellite cartography data including elevation data
to identify features in the three-dimensional satellite cartography data that correspond to the said three or more features in the image captured by the image capture device,
calculating the position, pan/tilt and roll angles of the laser range finder based on the subtended angles between the three or more features within the captured image and
checking that the bearing measurements correspond by comparing the first bearing measurement determined by using the laser range finder with the second bearing measurement calculated from the three-dimensional satellite cartography data, to check that the difference between the two sets of data is smaller than a predetermined value.

2. The targeting method of claim 1, comprising the steps of determining a bearing to a target from an observer using three or more independent techniques.

3. The targeting method of claim 1, further comprising:
determining a position of an observer using first and second independent techniques;
comparing the observer's positions as determined by the first and second independent techniques and based on the comparison, determining whether the observer's position is accurate; and
if the observer's position is deemed to be accurate;
measuring the bearing to the target from the observer;
measuring the range to the target from the observer; and
calculating the position the target using the verified position of the observer, the verified bearing and the range measurement.

4. The targeting method of claim 1, further comprising:
determining a range from an observer to a target using first and second independent techniques;
comparing the ranges as determined by the first and second independent techniques and determining whether the ranges are accurate; and
if the range is deemed to be accurate;

measuring the bearing to the target from the observer; and calculating the position the target based on the verified range and verified bearing from the observer's position.

5. The targeting method of claim 1, wherein the first and second independent techniques are different techniques.

6. The targeting method of claim 1, wherein one of the bearing verification techniques comprises using a magnetometer integrated into the sighting device.

7. The targeting method of claim 1, the bearing verification technique additionally comprises capturing a "field of view" image through a range finding device, the "field of view" image containing three or more identifiable features within a single image, picking-out features within the image, which have x and y pixel displacements relative to the centre pixel of the range finding device, and based on the relative pixel positions within the image and a calibration for aberrations in the lens, calculating the subtended angles both in azimuth and elevation to obtain the position, pan/tilt and roll angles of the range finding device based on the subtended angles between the features within the field of view and thereby calculating the bearings to the identifiable features within the field of view.

8. The targeting method of claim 7, comprising picking out four or more random, but identifiable features within the field of view; measuring the subtended azimuth and elevation angles between them; transposing the points of interest onto three-dimensional satellite cartography data, calculating the position and orientation of the range finding device with reference to the three-dimensional satellite cartography data, and scaling the angles within the field of view to actual, true bearings.

9. The targeting method of claim 8, further comprising the step of identifying a target within the image by placing a cursor upon it, and interpolating between the previously-determined bearings to obtain a true bearing from the observation point to the target.

10. The targeting method of claim 9, further comprising comparing a directly-measured bearing to the target with the bearing calculated from the three-dimensional satellite cartography data, and checking that they are close enough to one another to be deemed accurate.

11. The targeting method of claim 1, the bearing verification technique further comprises overlaying augmented reality markers in the field of view of a range finding device, the positions of the augmented reality markers being calculated from a measured location of the user and three-dimensional satellite cartography data, the verification being performed by observing whether the augmented reality markers displayed in the field of view align with objects to which they correspond in the actual field of view.

12. The targeting method of claim 11, further comprising the step of freezing the overlaid augmented reality markers relative to the field of view, moving the field of view so as to align the augmented reality markers with the objects to which they correspond in the actual field of view, and unfreezing the overlaid augmented reality markers.

13. The targeting method of claim 11, further comprising the step of capturing video or photographic imagery containing the actual field of view and as seen by the user through the range finding device.

14. The targeting method of claim 3, wherein one of the techniques for determining the position of the observer comprises using a GPS receiver on the observer's person or nearby, the GPS receiver being configured to receive latitude, longitude and elevation or similar coordinates, which define the observer's position.

15. The targeting method of any of claim 3, wherein one of the techniques for determining the position of the observer comprises the observer standing at a fixed position relative to a known, mapped landmark.

16. The targeting method of claim 15, wherein mapped landmark is a landmark on a three-dimensional map, which contains a plan view of the terrain in addition to an elevation map, which shows the elevation of objects/features on the map.

17. The targeting method of claim 16, wherein the verification of the position of the observer comprises triangulation by the observer taking bearings and ranges to a number of features within view, which correspond to identifiable features in the three-dimensional map satellite cartography data.

18. The targeting method of claim 17, wherein the range and bearing to object within the observer's field of view are obtained by taking photographs through a laser rangefinder type device, and wherein the captured photography data is optionally recorded for future reference/cross-checking purposes.

19. The targeting method of any of claim 4, wherein one of the techniques for determining the range to a target is measured using a laser rangefinder type device.

20. The targeting method of claim 4, wherein one of the techniques for determining the range to a target comprises using three-dimensional satellite cartography data containing elevation information about terrain contours and contours corresponding to object heights in the terrain, determining the position of the user within the three-dimensional satellite cartography map and a bearing to the target, the method further comprising tracing a ray from the calculated observation point within the three-dimensional cartography model to the target along a straight line corresponding to the azimuth and elevation of the bearing, extending that line through the three-dimensional satellite cartography image infinitely, and determining a first point from the observation point that the superimposed line impinges on the three-dimensional "surface" within the three-dimensional satellite cartography map, calculating a distance between that point and the determined observation point.

* * * * *